2,792,368
Patented May 14, 1957

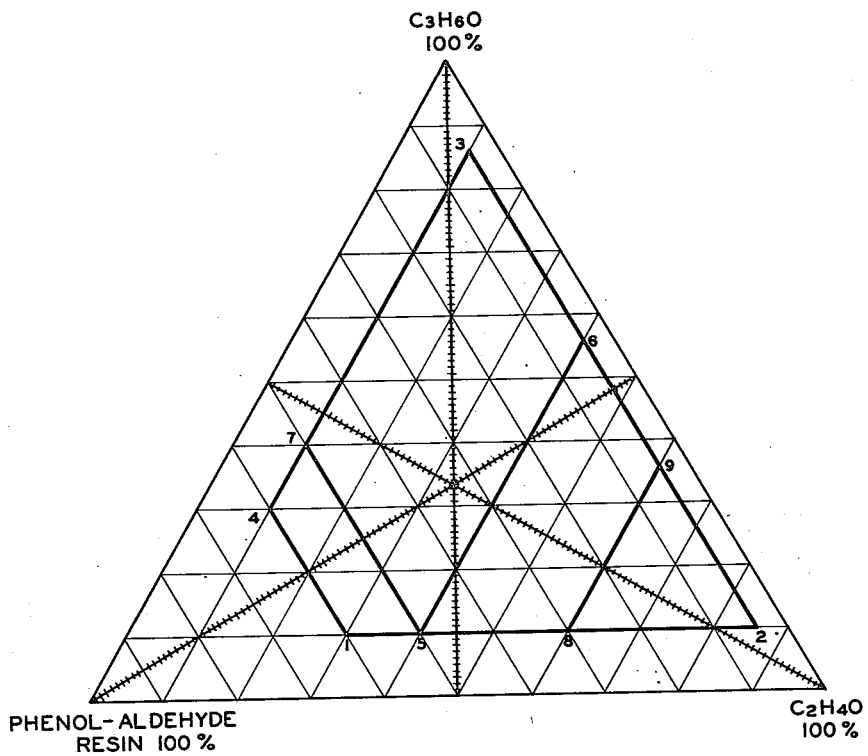

2,792,368

PROCESS FOR BREAKING PETROLEUM EMULSIONS EMPLOYING CYANOETHYLATED DERIVATIVES OF CERTAIN OXYALKYLATED RESINS

Melvin De Groote, University City, and Alvin Howard Smith, Glendale, Mo., assignors to Petrolite Corporation, Wilmington, Del., a corporation of Delaware Application August 6, 1954, Serial No. 448,172

8 Claims. (Cl. 252—344)

This invention relates to processes or procedures particularly adapted for preventing, breaking, or resolving emulsions of the water-in-oil type and particularly petroleum emulsions.

Our invention provides an economical and rapid process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities, particularly, inorganic salts, from pipeline oil.

More specifically then, the present invention is concerned with a process for breaking petroleum emulsions employing a demulsifier including compounds obtained by the chemical modification of hydrophile synthetic products by reaction with acrylonitrile or the equivalent. The hydrophile synthetic products are oxyalkylation products of (A) an alpha-beta alkylene oxide having not more than 4 carbon atoms and selected from the class consisting of ethylene oxide, propylene oxide, butylene oxide, glycide and methyl-glycide; and (B) an oxyalkylation-susceptible, fusible, organic solvent-soluble, water-insoluble phenol-aldehyde resin. The resin is derived by reaction between a difunctional monohydric phenol and an aldehyde having not over 8 carbon atoms and reactive toward said phenol and are formed in the substantial absence of trifunctional phenols. The phenol is of the formula

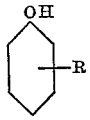

in which R is a hydrocarbon radical having at least 4 and not more than 18 carbon atoms and substituted in the 2,4,6 position. The oxyalkylated resin is characterized by the introduction into the resin molecule of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals and $n$ is a numeral varying from 1 to 40; with the proviso that at least 1 mole of alkylene oxide be introduced for each phenolic nucleus.

The preparation of hydrophile synthetic products, which are in essence polyols, by the oxyalkylation of phenol-aldehyde resins is well known and has been described in considerable detail in a large number of United States patents; for instance, United States Patents Nos. 2,499,365, 2,499,366, 2,499,367, 2,499,368, and 2,499,- 370, all dated March 7, 1950, and all to De Groote and Keiser. The preferred types and those particularly suitable for the present purpose are those described in the last mentioned patents with the proviso that the substituent radical may have as many as 18 carbon atoms. Reference is made also to U. S. Patent No. 2,577,081, dated June 1951, to De Groote and Keiser.

Briefly stated, the manufacturing method herein employed is to react an oxyalkylated phenol resin of the kind described in the various above mentioned patents with acrylonitrile in a ratio so there are employed preferably at least one mole of the nitrile for each oxyalkylated resin molecule.

In the co-pending applications of De Groote and Shen, Serial Nos. 343,804, filed March 20, 1953, and 349,972, filed April 20, 1953, there have been described more complicated oxyalkylation derivatives in which oxyalkylated resins were united by means of a polyepoxide, particularly a diglycidyl ether. Such polyepoxide derivatives also may be treated with acrylonitrile or its equivalent in the manner herein described. The resultant products are suitable for the same purpose and particularly for the resolution of petroleum emulsions of the water-in-oil type.

Oxyalkylated resins can be treated with polyepoxides particularly diglycidyl ethers as described in the co-pending applications of De Groote and Shen, Serial Nos. 349,972, filed April 20, 1953, and 343,804, filed March 20, 1953. Such oxyalkylated derivatives can be reacted with acrylonitrile or the equivalent as herein described in the same manner as compounds free from polyepoxide groups. This also applies to phenol-aldehyde resins which are first reacted with the polyepoxide and particularly a diglycidyl ether and then subjected to oxyalkylation. Such derivative likewise can be treated with acrylonitrile. However, these groups are not included in the instant invention.

It is to be noted that the oxyalkylated derivatives which are subjected to reaction with acrylonitrile or the equivalent may roughly represent two parts of the initial resin and ninety-eight percent of the alkylene oxide.

Reference is again made to U. S. Patent No. 2,499,368, dated March 7, 1950, to De Groote and Keiser. Attention is directed to that part of the text which appears in columns 28 and 29, lines 12 through 75, and lines 1 through 21, respectively. Reference is made to this text with the same force and effect as if it were herein included. This, in essence, means that the preferred product for resolution of petroleum emulsions of the water-in-oil type is characterized by the fact that a 50–50 solution in xylene or its equivalent, when mixed with one to three volumes of water and shaken will produce an emulsion.

For purpose of convenience, what is said hereinafter will be divided into four parts:

Part 1 is concerned with suitable phenol-aldehyde resins to be employed for reaction with monoepoxides;

Part 2 is concerned with the oxyalkylation of the previously described phenol-aldehyde resins;

Part 3 is concerned with the reactions between the oxyalkylated resins previously described and acrylonitrile or its equivalent;

Part 4 is concerned with the resolution of petroleum emulsions of the water-in-oil type by means of the previously-described chemical compounds or reaction products.

PART 1

This part is concerned with the preparation of phenol-aldehyde resins of the kind described in detail in U. S. Patent No. 2,499,370, dated March 7, 1950, to De Groote and Keiser, with the following qualifications; said aforementioned patent is limited to resins obtained from difunctional phenols having 4 to 12 carbon atoms in the substituent hydrocarbon radical. For the present purpose the substituent may have as many as 18 carbon atoms, as in the case of resins prepared from tetradecylphenol, substantially para-tetradecylphenol, commercially available. Similarly, resins can be prepared from hexadecylphenol or octadecylphenol. This feature will be referred to subsequently.

In addition to U. S. Patent No. 2,499,370, reference is made also to the following U. S. Patents: Nos. 2,499,365; 2,499,366; and 2,499,367, all dated March 7, 1950, to De Groote and Keiser. These patents, along with the other two previously mentioned patents, describe phenolic resins of the kind herein employed as initial materials.

For practical purposes, the resins having 4 to 12 carbon atoms are most satisfactory, with the additional $C_{14}$ carbon atom also being very satisfactory. The increased cost of the $C_{16}$ and $C_{18}$ carbon atom phenol renders these raw materials of less importance, at least at the present time.

Patent 2,499,370 describes in detail methods of preparing resins useful as intermediates for preparing the products of the present application, and reference is made to that patent for such detailed description and to Examples 1a through 103a of that patent for examples of suitable resins.

As previously noted, the hydrocarbon substituent in the phenol may have as many as 18 carbon atoms, as illustrated by tetradecylphenol, hexadecylphenol and octadecylphenol, reference in each instance being to the difunctional phenol, such as the ortho- or para- substituted phenol or a mixture of the same. Such resins are described also in issued patents, for instance, U. S. Patent No. 2,499,365, dated March 7, 1950, to De Groote and Keiser, such as Example 71a.

It is sometimes desirable to present the resins herein employed in an over-simplified form which has appeared from time to time in the literature, and particularly in the patent literature, for instance, it has been stated that the composition is approximated in an idealized form by the formula

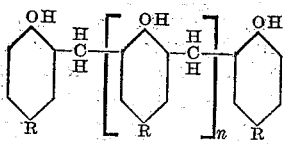

in the above formula $n$ represents a small whole number varying from 1 to 6, 7 or 8, or more, up to probably 10 or 12 units, particularly when the resin is subjected to heating under a vacuum as described in the literature. A limited sub-genus is in the instance of low molecular weight polymers where the total number of phenol nuclei varies from 3 to 6; i. e., $n$ varies from 1 to 4; R represents an aliphatic hydrocarbon substituent, generally an alkyl radical having from 4 to 14 carbon atoms, such as butyl, amyl, hexyl, decyl or dodecyl radical. Where the divalent bridge radical is shown as being derived from formaldehyde, it may, of course, be derived from any other reactive aldehyde having 8 carbon atoms or less.

In the above formula the aldehyde employed in the resin manufacture is formaldehyde. Actually, some other aldehyde such as acetaldehyde, propionaldehyde or butyraldehyde may be used. The resin unit can be exemplified thus:

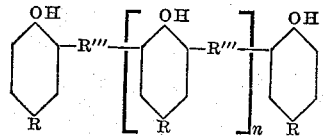

in which R''' is the divalent radical obtained from the particular aldehyde employed to form the resin.

As previously stated, the preparation of resins, the kind herein employed as reactants, is well known. See U. S. Patent No. 2,499,368, dated March 7, 1950, to De Groote and Keiser. Resins can be made using an acid catalyst or basic catalyst or a catalyst showing neither acid nor basic properties in the ordinary sense or without any catalyst at all. It is preferable that the resins employed be substantially alkaline. In other words, if prepared by using a strong acid as a catalyst, such strong acid should be neutralized. Similarly, if a strong base is used as a catalyst it is preferable that the base be left intact in the resin.

In preparing resins one does not get a single polymer, i. e., one having just 3 units, or just 4 units, or just 5 units, or just 6 units, etc. It is usually a mixture; for instance, one approximating 4 phenolic nuclei will have some trimer and pentamer present. Thus, the molecular weight may be such that it corresponds to a fractional value for $n$ as, for example, 3.5; 4.5; or 5.2.

In the actual manufacture of the resins we found no reason for using other than those which are lowest in price and most readily available commercially. For purpose of convenience suitable resins are characterized in the following table:

TABLE I

| Example number | R | Position of R | R''' derived from— | $n$ | Mol. wt. of resin molecule (based on $n+2$) |
|---|---|---|---|---|---|
| 1a | Phenyl | Para | Formaldehyde | 3.5 | 992.5 |
| 2a | Tertiary butyl | do | do | 3.5 | 882.5 |
| 3a | Secondary butyl | Ortho | do | 3.5 | 882.5 |
| 4a | Cyclo-hexyl | Para | do | 3.5 | 1,025.5 |
| 5a | Tertiary amyl | do | do | 3.5 | 959.5 |
| 6a | Mixed secondary and tertiary amyl | Ortho | do | 3.5 | 805.5 |
| 7a | Propyl | Para | do | 3.5 | 805.5 |
| 8a | Tertiary hexyl | do | do | 3.5 | 1,036.5 |
| 9a | Octyl | do | do | 3.5 | 1,190.5 |
| 10a | Nonyl | do | do | 3.5 | 1,267.5 |
| 11a | Decyl | do | do | 3.5 | 1,344.5 |
| 12a | Dodecyl | do | do | 3.5 | 1,498.5 |
| 13a | Tertiary butyl | do | Acetaldehyde | 3.5 | 945.5 |
| 14a | Tertiary amyl | do | do | 3.5 | 1,022.5 |
| 15a | Nonyl | do | do | 3.5 | 1,330.5 |
| 16a | Tertiary butyl | do | Butyraldehyde | 3.5 | 1,071.5 |
| 17a | Tertiary amyl | do | do | 3.5 | 1,148.5 |
| 18a | Nonyl | do | do | 3.5 | 1,456.5 |
| 19a | Tertiary butyl | do | Propionaldehyde | 3.5 | 1,008.5 |
| 20a | Tertiary amyl | do | do | 3.5 | 1,085.5 |
| 21a | Nonyl | do | do | 3.5 | 1,393.5 |
| 22a | Tertiary butyl | do | Formaldehyde | 4.2 | 996.6 |
| 23a | Tertiary amyl | do | do | 4.2 | 1,083.4 |
| 24a | Nonyl | do | do | 4.2 | 1,430.6 |
| 25a | Tertiary butyl | do | do | 4.8 | 1,094.4 |
| 26a | Tertiary amyl | do | do | 4.8 | 1,189.6 |
| 27a | Nonyl | do | do | 4.8 | 1,570.4 |
| 28a | Tertiary amyl | do | do | 1.5 | 604.0 |
| 29a | Cyclo-hexyl | do | do | 1.5 | 646.0 |
| 30a | Hexyl | do | do | 1.5 | 653.0 |
| 31a | do | do | Acetaldehyde | 1.5 | 658.0 |
| 32a | Octyl | do | do | 1.5 | 786.0 |
| 33a | Nonyl | do | do | 1.5 | 835.0 |
| 34a | Octyl | do | Butyraldehyde | 2.0 | 986.0 |
| 35a | Nonyl | do | do | 2.0 | 1,028.0 |
| 36a | Amyl | do | do | 2.0 | 860.0 |
| 37a | Butyl | do | Formaldehyde | 2.0 | 636.0 |
| 38a | Amyl | do | do | 2.0 | 692.0 |
| 39a | Hexyl | do | do | 2.0 | 748.0 |
| 40a | Cyclo-hexyl | do | do | 2.0 | 740.0 |

PART 2

There have been issued a substantial number of patents which give detailed description of the preparation of oxyalkylated derivatives of resins of the kind previously described. For example, see U. S. Patents 2,499,365; 2,499,366; 2,499,367; 2,499,368; and 2,499,370, all dated March 7, 1950, to De Groote and Keiser.

More specifically, a number of other patents have appeared in which the oxyethylation step is given with considerable detail. See, for example, U. S. Patents 2,581,376; 2,581,377; 2,581,378; 2,581,379; 2,581,380; and 2,581,381, all dated January 8, 1952, to De Groote and Keiser. As to further examples, see U. S. Patent 2,602,052, dated July 1, 1952, to De Groote.

The oxypropylation or, for that matter, the treatment of resins with butylene oxide, glycide, or methyl glycide, has been described in the first of the series of the above mentioned patents, i. e., those issued in 1950.

Reference is made to U. S. Patent 2,557,081, dated June 19, 1951, to De Groote and Keiser. This particular patent describes in considerable detail resins which are first treated with propylene oxide and then with ethylene oxide or with ethylene oxide and then propylene oxide or with both oxides simultaneously.

In order to avoid an extensive repetition of what is already described in detail in the patent literature, we are referring to the tables beginning in column 21 of U. S. Patent 2,581,376 and extending through column 36. We have simply numbered these products beginning with 1b, allotting, of course, five numbers to each table beginning with the first table. For convenience these sixteen tables are summarized in the following table:

TABLE II

| Ex. No. | Phenol | Aldehyde | Solvent, lbs. | Resin, lbs. | Ethylene oxide, lbs. |
|---|---|---|---|---|---|
| 1b | Para-tertiary amyl | Formaldehyde | 14.25 | 15.75 | 4.00 |
| 2b | do | do | 10.90 | 12.10 | 15.25 |
| 3b | do | do | 7.13 | 7.93 | 19.69 |
| 4b | do | do | 3.84 | 4.25 | 16.15 |
| 5b | do | do | 1.80 | 2.04 | 10.20 |
| 6b | Nonyl | do | 15.00 | 15.00 | 3.00 |
| 7b | do | do | 10.00 | 10.00 | 9.40 |
| 8b | do | do | 7.27 | 7.27 | 13.70 |
| 9b | do | do | 3.15 | 3.15 | 8.95 |
| 10b | do | do | 2.10 | 2.10 | 8.00 |
| 11b | Para-octyl | do | 14.20 | 15.80 | 3.25 |
| 12b | do | do | 11.10 | 12.40 | 12.50 |
| 13b | do | do | 6.64 | 7.36 | 15.00 |
| 14b | do | do | 4.40 | 4.90 | 14.80 |
| 15b | do | do | 4.10 | 4.58 | 18.52 |
| 16b | Menthyl | do | 13.65 | 16.35 | 3.00 |
| 17b | do | do | 10.00 | 12.00 | 10.75 |
| 18b | do | do | 5.48 | 6.58 | 10.85 |
| 19b | do | do | 4.10 | 4.90 | 13.15 |
| 20b | do | do | 3.10 | 3.72 | 13.43 |
| 21b | Para-secondary butyl | do | 14.45 | 15.55 | 4.25 |
| 22b | do | do | 8.48 | 9.17 | 16.00 |
| 23b | do | do | 4.82 | 5.18 | 14.25 |
| 24b | do | do | 3.85 | 4.15 | 17.00 |
| 25b | do | do | 2.65 | 2.85 | 15.45 |
| 26b | Menthyl | Propionaldehyde | 12.80 | 17.20 | 2.75 |
| 27b | do | do | 8.55 | 11.50 | 9.30 |
| 28b | do | do | 3.77 | 5.08 | 13.10 |
| 29b | do | do | 15.20 | 7.00 | 17.00 |
| 30b | do | do | 2.10 | 2.83 | 9.12 |
| 31b | Para-tertiary amyl | Furfural | 11.20 | 18.00 | 3.50 |
| 32b | do | do | 8.45 | 13.60 | 12.65 |
| 33b | do | do | 4.50 | 8.00 | 14.50 |
| 34b | do | do | 3.42 | 5.48 | 15.10 |
| 35b | do | do | 2.05 | 3.65 | 13.35 |
| 36b | Menthyl | do | 10.25 | 17.75 | 2.50 |
| 37b | do | do | 7.60 | 13.15 | 9.35 |
| 38b | do | do | 4.22 | 6.98 | 10.00 |
| 39b | do | do | 3.76 | 6.24 | 13.25 |
| 40b | do | do | 2.40 | 4.15 | 11.70 |
| 41b | Para-octyl | do | 12.10 | 18.60 | 3.00 |
| 42b | do | do | 9.25 | 14.25 | 11.00 |
| 43b | do | do | 6.72 | 10.32 | 14.91 |
| 44b | do | do | 5.52 | 8.52 | 19.811 |
| 45b | do | do | 1.75 | 2.70 | 8.40 |
| 46b | Para-phenyl | do | 13.90 | 16.70 | 3.00 |
| 47b | do | do | 10.35 | 12.45 | 12.20 |
| 48b | do | do | 8.90 | 10.70 | 19.00 |
| 49b | do | do | 5.20 | 6.26 | 16.64 |
| 50b | do | do | 3.60 | 4.32 | 15.68 |

TABLE II—Continued

| Ex. No. | Phenol | Aldehyde | Solvent, lbs. | Resin, lbs. | Ethylene oxide, lbs. |
|---|---|---|---|---|---|
| 51b | Para-secondary nonyl | Furfural | 10.85 | 20.75 | 3.00 |
| 52b | do | do | 8.28 | 15.85 | 11.77 |
| 53b | do | do | 5.95 | 11.25 | 16.75 |
| 54b | do | do | 4.46 | 8.52 | 19.07 |
| 55b | do | do | 2.57 | 4.93 | 14.50 |
| 56b | | | | | |
| 57b | Para-phenyl | Formaldehyde | 11.00 | 9.00 | 11.75 |
| 58b | | | | | |
| 59b | | | | | |
| 60b | Para-phenyl | | 3.41 | 2.80 | 13.64 |
| 61b | Para-secondary butyl | Furfural | 12.00 | 17.90 | 3.50 |
| 62b | do | do | 9.35 | 13.92 | 13.23 |
| 63b | do | do | 6.25 | 8.95 | 17.00 |
| 64b | do | do | 4.35 | 6.50 | 18.40 |
| 65b | do | do | 3.02 | 4.34 | 16.49 |
| 66b | Para-octyl | Propionaldehyde | 13.30 | 16.90 | 3.00 |
| 67b | do | do | 10.20 | 12.90 | 11.30 |
| 68b | do | do | 6.46 | 8.24 | 16.50 |
| 69b | do | do | 3.86 | 4.87 | 13.02 |
| 70b | do | do | 2.94 | 3.75 | 13.26 |
| 71b | Para-nonyl | do | 10.90 | 18.00 | 3.00 |
| 72b | do | do | 8.25 | 13.60 | 11.50 |
| 73b | do | do | 5.65 | 9.35 | 15.75 |
| 74b | do | do | 3.15 | 5.25 | 13.45 |
| 75b | do | do | 1.94 | 3.21 | 10.65 |
| 76b | Para-tertiary amyl | do | 12.60 | 16.20 | 3.50 |
| 77b | do | do | 9.52 | 12.24 | 12.89 |
| 78b | do | do | 6.50 | 8.30 | 17.75 |
| 79b | do | do | 4.25 | 5.45 | 17.25 |
| 80b | do | do | 2.69 | 3.43 | 14.55 |

NOTE.—For ease of comparison blanks appear in the above table where blanks appear in previously mentioned tables in U. S. Patent 2,581,376.

Oxypropylated derivatives comparable to 1b through 80b as described above can readily be obtained by substituting a molar equivalent amount of propylene oxide, i. e., 56 lbs. of propylene oxide, for example, for each 44 lbs. of ethylene oxide. We have prepared such a similar series but for sake of brevity only a few will be included for purposes of illustration.

TABLE III

| Ex. No. | Oxypropylated analog | Phenol | Aldehyde | Solvent, lbs. | Resin, lbs. | Propylene oxide, lbs. |
|---|---|---|---|---|---|---|
| 1c | 1b | Para-tertiary amyl | Formaldehyde | 14.25 | 15.75 | 5.10 |
| 2c | 2b | do | do | 10.90 | 12.10 | 19.40 |
| 3c | 3b | do | do | 7.13 | 7.93 | 25.30 |
| 4c | 4b | do | do | 3.84 | 4.25 | 23.00 |
| 5c | 5b | do | do | 1.80 | 2.04 | 13.00 |
| 66c | 66b | Para-octyl | Propionaldehyde | 13.30 | 16.90 | 3.82 |
| 67c | 67b | do | do | 10.20 | 12.90 | 14.40 |
| 68c | 68b | do | do | 6.46 | 8.24 | 21.00 |
| 69c | 69b | do | do | 3.86 | 4.87 | 16.60 |
| 70c | 70b | do | do | 2.94 | 3.75 | 16.80 |
| 76c | 76b | Para-tertiary amyl | Formaldehyde | 12.60 | 16.20 | 4.46 |
| 77c | 77b | do | do | 9.52 | 12.24 | 16.45 |
| 78c | 78b | do | do | 6.50 | 8.30 | 22.60 |
| 79c | 79b | do | do | 4.25 | 5.45 | 22.00 |
| 80c | 80b | do | do | 2.69 | 4.43 | 18.55 |

As an illustration of oxypropylated resins involving the use of both ethylene and propylene oxide, a reference is made to the aforementioned U. S. Patent 2,557,081, dated June 19, 1951, to De Groote and Keiser. The last table in column 28 of said patent describes in detail the preparation of a series of oxyalkylated resins in which both propylene and ethylene oxide are employed. Simply by illustration, a series of 27 compounds are included, the description of which appears in detail in said aforementioned U. S. Patent 2,577,081, to De Groote and Keiser. Note the hereto attached drawing is identical with the drawing which appears in said U. S. Patent No. 2,557,081,

TABLE IV

| Ex. No. | See U.S. Pat. 2,557,081 Ex. No. in above patent | See U.S. Pat. 2,557,081 Point on graph on above patent | Resin used | Resin, lbs. | Ethylene oxide, lbs. | Propylene oxide, lbs. | Wt. of xylene | Flake caustic soda, ounces |
|---|---|---|---|---|---|---|---|---|
| 1d | A | 1 | Tert. amyl phenol formaldehyde. | 6 | 3 | 1 | 10 | 1 |
| 2d | B | 5 | ---do--- | 5 | 4 | 1 | 10 | 1 |
| 3d | C | 8 | ---do--- | 3 | 6 | 1 | 10 | 1 |
| 4d | D | 2 | ---do--- | 1 | 21.5 | 2.5 | 25 | 2 |
| 5d | E | 9 | ---do--- | 1 | 15 | 9 | 25 | 2 |
| 6d | F | 6 | ---do--- | 1 | 10 | 15 | 25 | 2 |
| 7d | G | 3 | ---do--- | 1 | 2.5 | 21.5 | 25 | 2 |
| 8d | H | 7 | ---do--- | 5 | 1 | 4 | 10 | 1 |
| 9d | I | 4 | ---do--- | 6 | 1 | 3 | 10 | 1 |
| 10d | A | 1 | Tert. butyl phenol formaldehyde. | 6 | 3 | 1 | 10 | 1 |
| 11d | B | 5 | ---do--- | 5 | 4 | 1 | 10 | 1 |
| 12d | C | 8 | ---do--- | 3 | 6 | 1 | 10 | 1 |
| 13d | D | 2 | ---do--- | 1 | 21.5 | 2.5 | 25 | 2 |
| 14d | E | 9 | ---do--- | 1 | 15 | 9 | 25 | 2 |
| 15d | F | 6 | ---do--- | 1 | 10 | 14 | 25 | 2 |
| 16d | G | 3 | ---do--- | 1 | 2.5 | 21.5 | 25 | 2 |
| 17d | H | 7 | ---do--- | 5 | 1 | 4 | 10 | 1 |
| 18d | I | 4 | ---do--- | 6 | 1 | 3 | 10 | 1 |
| 19d | A | 1 | Nonyl phenol-formaldehyde. | 6 | 3 | 1 | 10 | 1 |
| 20d | B | 5 | ---do--- | 5 | 4 | 1 | 10 | 1 |
| 21d | C | 8 | ---do--- | 3 | 6 | 1 | 10 | 1 |
| 22d | D | 2 | ---do--- | 1 | 21.5 | 2.5 | 25 | 2 |
| 23d | E | 9 | ---do--- | 1 | 15 | 9 | 25 | 2 |
| 24d | F | 6 | ---do--- | 1 | 10 | 14 | 25 | 2 |
| 25d | G | 3 | ---do--- | 1 | 2.5 | 21.5 | 25 | 2 |
| 26d | H | 7 | ---do--- | 5 | 1 | 4 | 10 | 1 |
| 27d | I | 4 | ---do--- | 6 | 1 | 3 | 10 | 1 |

Note the first series of nine compounds, 1d through 9d were prepared with propylene oxide, first and then ethylene oxide. The second nine compounds, 10d through 18d inclusive, were prepared using ethylene oxide first and then propylene oxide, and the last nine compounds, 19d through 27d, were prepared by random oxyalkylation, i. e., using a mixture of the two oxides.

In the preparation of the resins, our preference is to use hydrocarbon substituted phenols, particularly para-substituted, in which the substituted radical R contains 4 to 18 carbon atoms and particularly 4 to 14 carbon atoms. The amount of alkylene oxide introduced may be comparatively large in comparison to the initial resin. For instance, there may be as much as 50 parts by weight of an oxide or mixed oxides used for each part by weight of resin employed.

It will be noted that the various resins referred to in the aforementioned U. S. Patent 2,499,370 are substantially the same type of materials as referred to in Table I. For instance, resin 3a of the table is substantially the same as 2a of the patent; resin 20a of the table is substantially the same as 34a of the patent; and resin 38a of the table is the same as 3a of the patent.

In reaction with polyepoxides, and particularly diepoxides, a large number of the previously described oxyalkylated resins have been employed. For convenience, the following list is selected indicating the previously described compounds and their molecular weights. Such resins are generally employed as a 50% solution and the polyepoxide employed is a 50% solution, usually both reactants being dissolved in xylene and sufficient sodium methylate added to act as a catalyst, for instance, 1 to 2%.

TABLE V

| Example number | Molecular weight |
|---|---|
| 1b | 1,202 |
| 2b | 2,169 |
| 3b | 3,339 |
| 4b | 4,609 |
| 5b | 5,749 |
| 6b | 1,509 |
| 7b | 2,466 |
| 8b | 3,657 |
| 9b | 5,867 |
| 10b | 6,087 |
| 1c | 1,270 |
| 2c | 2,494 |
| 3c | 4,019 |
| 4c | 6,139 |
| 5c | 7,079 |
| 1d | 1,697 |
| 2d | 1,918 |
| 3f | 3,189 |
| 4d | 23,959 |
| 5d | 23,959 |
| 6d | 24,909 |
| 7d | 23,959 |
| 8d | 1,918 |
| 9d | 1,697 |

PART 3

As stated previously, the final reaction involves the use of acrylonitrile and an oxyalkylated phenolaldehyde resin of the kind previously noted. The amount of acrylonitrile used may be as little as one mole of acrylonitrile for each mole of oxyalkylated resin but not in excess of one mole of acrylonitrile for each hydroxyl group present in the oxyalkylated phenol-aldehyde resin.

As is well known, acrylonitrile reacts readily with hydroxylated compounds of the kind illustrated by phenol-aldehyde resins. This also applies to the oxyalkylated resins. Sometime such products are solids or viscous liquids. For this reason it is advantageous to use an inert solvent and also because an inert solvent, if properly selected, is helpful in determining the maximum reaction temperature. It also leads to ease of cooling the products by conventional means. Generally speaking, we have conducted the reaction in the presence of an inert solvent such as benzene, toluene, xylene or the like and at a temperature below the boiling point of water. In many cases 60–80° C. is a very satisfactory temperature. Reaction takes place readily and ordinarily a reaction period of 1 to 2 hours is more than sufficient.

Although the reaction may go slowly in the absence of a catalyst we have preferred to use an alkaline catalyst such as caustic soda, sodium methylate or the like, in a comparatively small amount, generally one percent or less and in many cases ½ of one percent.

Since oxyalkylation is generally conducted in the presence of an alkaline catalyst it is most convenient to simply permit the residual catalyst from this reaction to remain and be used if the amount is sufficient as the catalyst for the cyanoethylation process. If the amount is not sufficient more can be added. The products obtained by cyanoethylation have one perculiarity and this is an unusual optical property which gives the product brilliance or glossiness and thus indicating a marked change in refractive index, or index of dispersion, or both, as compared with the oxyalkylated intermediate prior to cyanoethylation.

The color of the product is usually the same as the oxyalkylated product being subjected to cyanoethylation. If such products have been bleached or are almost water white then the products will be the same. If the intermediate prior to cyanoethylation is straw-colored, amber, or reddish then this will also be, in a general way, the appearance of the cyanoethylated product. The products obtained by cyanoethylation can be bleached by the use of filtered clays, chars and the like but for the present purposes herein described this is not necessary.

The reaction should be conducted under anhydrous or substantially anhydrous conditions. Sometimes the product subjected to cyanoethylation may contain some amounts of water, for instance a few tenths of a percent or slightly more. Under such instances enough excess acrylonitrile should be added to combine with the water. Our preference is to dissolve the oxyalkylated resin preferably with the alkaline catalyst still remaining in a suitable amount of xylene, toluene or benzene so as to be approximately equal in weight to the oxyalkylated intermediate. We prefer to hold the temperature of the material at about 60° C. and slowly add the acrylonitrile by any conventional means. If the temperature shows any tendency to rise it is controlled in the usual way and the reaction kept within the range of 60–80° C. In the final stage of the reaction our preference is to raise the temperature to somewhere within the range of 70–80° C. and hold it in this maximum range for approximately 1 hour. Generally speaking, the odor of acrylonitrile disappears completely at the end of an hour or two and indeed is a good index of completion of reaction. As is well known the odor is highly characteristic. It is to be noted that the final product is not subjected to any further reaction as far as this instant invention is concerned. In other words, there is no reaction with water or the like. Indeed, it has been very surprising to find that in the resolution of petroleum emulsions these products having terminal cyanoethyl groups are more effective in a number of emulsions than the comparable products before cyanoethylation and also more effective on certain derivatives where the cyanoethyl group is replaced by a group that is distinctly more hydrophile, for instance, an ammonium neutralized carboxyl group.

Purely by way of example the following is included:

Example 1e

The oxyethylated resin described in Table II as Example 2b was placed in a suitable vessel containing heating and cooling coils, an agitator, a thermometer, and adequate fume disposal. The 41.60 lb. of resin was brought up to a temperature of 70° C. No additional alkaline catalyst was added, since the oxyethylated resin was still alkaline from the oxyalkylation catalyst added previously. 4.1 lb. of acrylonitrile were added over a period of one hour. At this rate, it was possible to maintain the temperature between 70 to 75° C. The batch was held at 70° C. for an additional two hours, whereupon 10.15 pounds of solvent was added. The batch was then pumped out of the vessel to storage as a 50% active solution. No odor of acrylonitrile could be detected in the finished product.

Example 2e

The oxyethylated resin described in Table II as Example 3b was diluted with 22.5 lb. of solvent and pumped into a vessel similar to that mentioned above in Example 1e. For this case, the ratio of ethylene oxide to resin is much greater than that found in 1e, therefore the oxyalkylation catalyst was somewhat depleted. Accordingly, 0.5 pound of sodium methylate were added as a cyanoethylation catalyst. The batch was held at 65° C. while 2.0 pounds of acrylonitrile were added over a period of one-half hour. After being stirred two more hours at this temperature, the odor of acrylonitrile was absent and the batch was pumped to storage.

The above two examples together with the following examples are shown in Tables VI and VII. The table form is used in the interest of expediency, since the procedure used in the cyanoethylations is similar in all cases.

TABLE VI

| Ex. No. | Oxyalkylated resin, Ex. No. | Resin, lbs. | Ethylene oxide, lbs. | Propylene oxide, lbs. | Sodium methylate catalyst, lbs. | Acrylonitrile, lbs. | Total solvents, lbs. |
|---|---|---|---|---|---|---|---|
| 1e | 2b | 12.1 | 15.25 | | | 4.1 | |
| 2e | 3b | 7.93 | 19.69 | | 0.5 | 2.0 | 29.62 |
| 3e | 6d | 15.00 | 3.00 | | | 8.0 | 26.0 |
| 4e | 8b | 7.27 | 13.70 | | 0.5 | 6.3 | 27.1 |
| 5e | 21b | 15.55 | 4.25 | | | 9.7 | 29.5 |
| 6e | 22b | 9.17 | 16.00 | | 0.25 | 2.0 | 27.2 |
| 7e | 23b | 5.18 | 14.25 | | 0.25 | 1.7 | 21.1 |
| 8e | 27b | 11.5 | 9.3 | | | 1.8 | 22.6 |
| 9e | 32b | 13.6 | 12.65 | | | 7.0 | 33.2 |
| 10e | 34b | 5.48 | 15.10 | | 0.5 | 2.5 | 23.1 |
| 11e | 57b | 9.0 | 11.75 | | | 3.1 | 23.8 |
| 12e | 66b | 16.9 | 3.00 | | | 9.3 | 29.2 |
| 13e | 67b | 12.9 | 11.3 | | | 3.8 | 28.0 |
| 14e | 76b | 16.2 | 3.5 | | | 10.3 | 30.0 |
| 15e | 77b | 12.24 | 12.89 | | | 4.2 | 29.5 |
| 16e | 78b | 8.3 | 17.75 | | 0.25 | 1.5 | 27.5 |
| 17e | 1c | 15.75 | | 5.1 | | 9.7 | 30.5 |
| 18e | 2c | 12.10 | | 19.4 | | 6.2 | 37.7 |
| 19e | 3c | 7.93 | | 25.3 | 0.7 | 5.0 | 38.2 |
| 20e | 4c | 4.25 | | 23.0 | 0.8 | 1.0 | 28.25 |
| 21e | 66c | 16.9 | | 3.82 | | 8.3 | 29.0 |
| 22e | 1d | 6.0 | 3.0 | 1.0 | | 4.3 | 14.3 |
| 23e | 2d | 5.0 | 4.0 | 1.0 | | 4.0 | 14.0 |
| 24e | 3d | 3.0 | 6.0 | 1.0 | | 1.1 | 11.1 |
| 25e | 4d | 1.0 | 21.5 | 2.5 | 0.1 | 0.25 | 25.75 |
| 26e | 8d | 5.0 | 1.0 | 4.0 | | 3.1 | 13.10 |
| 27e | 10d | 6.0 | 3.0 | 1.0 | | 2.1 | 12.1 |
| 28e | 11d | 5.0 | 4.0 | 1.0 | | 3.8 | 13.8 |
| 29e | 12d | 3.0 | 6.0 | 1.0 | | 1.0 | 11.0 |
| 30e | 15d | 1.0 | 10.0 | 14.0 | 0.2 | 0.77 | 25.7 |
| 31e | 18d | 6.0 | 1.0 | 3.0 | | 2.1 | 12.1 |
| 32e | 19d | 6.0 | 3.0 | 1.0 | | 1.9 | 11.9 |
| 33e | 21d | 3.0 | 6.0 | 1.0 | | 0.8 | 10.8 |
| 34e | 27d | 6.0 | 1.0 | 3.0 | | 2.5 | 12.5 |

TABLE VII

| Ex. No. | Av. temp., °C. | Add'n. time, hours | Digestion time, hrs. | Nitrile odor | Approximate mol. ratio nitrile to resin |
|---|---|---|---|---|---|
| 1e | | | | Negative | 2 |
| 2e | | | | do | 1 |
| 3e | 77 | 2.0 | 2.5 | do | 4 |
| 4e | 80 | 1.0 | 2.0 | do | 3 |
| 5e | 65 | 2.5 | 3.3 | do | 4 |
| 6e | 77 | 0.5 | 1.5 | do | 1 |
| 7e | 80 | 0.5 | 1.5 | do | 1 |
| 8e | 70 | 0.75 | 2.0 | do | 1 |
| 9e | 75 | 1.5 | 2.0 | d | 3 |
| 10e | 80 | 1.0 | 1.0 | do | 2 |
| 11e | 70 | 1.3 | 2.0 | do | 2 |
| 12e | 77 | 1.75 | 2.5 | do | 4 |
| 13e | 60 | 1.0 | 2.0 | do | 2 |
| 14e | 77 | 2.0 | 2.5 | do | 4 |
| 15e | 70 | 1.25 | 2.0 | do | 2 |
| 16e | 75 | 0.25 | 1.75 | do | 1 |
| 17e | 80 | 2.0 | 4.0 | do | 4 |
| 18e | 65 | 1.5 | 2.0 | do | 3 |
| 19e | 70 | 1.25 | 2.5 | do | 4 |
| 20e | 75 | 0.25 | 1.75 | do | 2 |
| 21e | 60 | 2.15 | 1.5 | do | 4 |
| 22e | 75 | 1.0 | 1.75 | do | 4 |
| 23e | 70 | 1.0 | 2.0 | do | 4 |
| 24e | 75 | 0.5 | 1.8 | do | 4 |
| 25e | 70 | 0.25 | 1.0 | do | 2 |
| 26e | 75 | 0.5 | 1.5 | do | 1 |
| 27e | 67 | 0.5 | 2.0 | do | 3 |
| 28e | 77 | 0.5 | 1.5 | do | 2 |
| 29e | 80 | 0.2 | 1.2 | do | 4 |
| 30e | 75 | 0.5 | 1.0 | do | 2 |
| 31e | 77 | 1.0 | 1.5 | do | 4 |
| 32e | 65 | 1.0 | 2.0 | do | 4 |
| 33e | 70 | 0.3 | 1.6 | do | 2 |
| 34e | 77 | 1.2 | 2.0 | do | 3 |

PART 4

As to the use of conventional demulsifying agents reference is made to U. S. Patent No. 2,626,929, dated January 7, 1953, to De Groote and particularly to Part 3. Everything that appears therein applies with equal force and effect to the instant process, noting only that where reference is made to Example 13b in said text beginning in column 15 and ending in column 18, reference should be to Example 1e, herein described.

Having thus described our invention what we claim as new and desire to secure by Letters Patent, is

1. The process of breaking petroleum emulsions of the water-in-oil type characterized by subjecting the emulsion to a demulsifying agent including a synthetic hydrophile product obtained by the chemical modification of (AA) hydrophile synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide; and (B) an oxyalkylation-susceptible, fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial obsence of trifunctional phenols; said phenol being of the formula

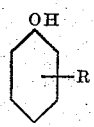

in which R is a hydrocarbon radical having at least 4 and not more than 18 carbon atoms and substituted in the 2,4,6, position; said oxyalkylated resin being characterized by the introduction into the resin molecule of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals and $n$ is a numeral varying from 1 to 40; with the proviso that at least 2 moles of alkylene oxide be introduced for each phenolic nucleus; by reaction with (BB) acrylonitrile; said reaction being conducted in a substantially anhydrous state in the presence of an alkaline catalyst and at a temperature at least sufficiently high to induce cyanoethylation and below the point of pyrolysis; with the proviso that the products of reaction be organic solvent-soluble, the molar ratio of reactants being at least 1 mole of acrylonitrile for each mole of oxyalkylated resin and not in excess of 1 mole of acrylonitrile for each hydroxyl group present in the oxyalkylated phenol-aldehyde resin.

2. The process of breaking petroleum emulsions of the water-in-oil type characterized by subjecting the emulsion to a demulsifying agent including a synthetic hydrophile product obtained by the chemical modification of (AA) hydrophile synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide; and (B) an oxyalkylation-susceptible, fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

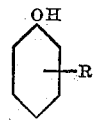

in which R is a hydrocarbon radical having at least 4 and not more than 18 carbon atoms and substituted in the 2, 4, 6 position; said oxyalkylated resin being characterized by the introduction into the resin molecule of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals and $n$ is a numeral varying from 1 to 40; with the proviso that at least 2 moles of alkylene oxide be introduced for each phenolic nucleus; by reaction with (BB) acrylonitrile; said reaction being conducted in a substantially anhydrous state in the presence of an alkaline catalyst and at a temperature at least sufficiently high to induce cyanoethylation and below the point of pyrolysis; with the proviso that the products of reaction be organic solvent-soluble, the molar ratio of reactants being at least 2 moles of acrylonitrile for each mole of oxyalkylated resin and not in excess of 1 mole of acrylonitrile for each hydroxyl group present in the oxyalkylated phenol-aldehyde resin.

3. The process of breaking petroleum emulsions of the water-in-oil type characterized by subjecting the emulsion to a demulsifying agent including a synthetic hydrophile product obtained by the chemical modification of (AA) hydrophile synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide; and (B) an oxyalkylation-susceptible, fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

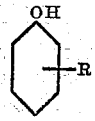

in which R is a hydrocarbon radical having at least 4 and not more than 18 carbon atoms and substituted in the 2, 4, 6 position; said oxyalkylated resin being characterized by the introduction into the resin molecule of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals and $n$ is a numeral varying from 1 to 40; with the proviso that at least 2 moles of alkylene oxide be introduced for each phenolic nucleus; by reaction with (BB) acrylonitrile; said reaction being conducted in a substantially anhydrous state in the presence of an alkaline catalyst and at a temperature below the boiling point of water; with the proviso that the products of reaction be organic solvent-soluble, the molar ratio of reactants being at least 2 moles of acrylonitrile for each mole of oxyalkylated resin and not in excess of 1 mole of acrylonitrile for each hydroxyl group present in the oxyalkylated phenol-aldehyde resin.

4. The process of breaking petroleum emulsions of the water-in-oil type characterized by subjecting the emulsion to a demulsifying agent including a synthetic hydrophile product obtained by the chemical modification of (AA) hydrophile synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide; and (B) an oxyalkylation-susceptible, fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

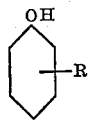

in which R is a hydrocarbon radical having at least 4 and not more than 18 carbon atoms and substituted in the 2, 4, 6 position; said oxyalkylated resin being characterized by the introduction into the resin molecule of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals and $n$ is a numeral varying from 1 to 40; with the proviso that at least 2 moles of alkylene oxide be introduced for each phenolic nucleus; by reaction with (BB) acrylonitrile; said reaction being conducted in a substantially anhydrous state in the presence of an alkaline catalyst and at a temperature below the boiling point of water; with the proviso that the products reaction be organic solvent-soluble, the molar ratio of reactants being at least 2 moles of acrylonitrile for each mole of oxyalkylated resin and not in excess of 1 mole of acrylonitrile for each hydroxyl group present in the oxyalkylated phenol-aldehyde resin; said cyanoethylation being conducted in the presence of not over 1.0 percent of an alkaline catalyst based on the total weight of reactants.

5. The process of breaking petroleum emulsions of the water-in-oil type characterized by subjecting the emulsion to a demulsifying agent including a synthetic hydrophile product obtained by the chemical modification of (AA) hydrophile synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide, and (B) an oxyalkylation-susceptible, fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

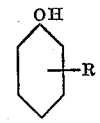

in which R is a hydrocarbon radical having at least 4 and not more than 14 carbon atoms and substituted in the 2, 4, 6 position; said oxyalkylated resin being characterized by the introduction into the resin molecule of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals and $n$ is a numeral varying from 1 to 40; with the proviso that at least 2 moles of alkylene oxide be introduced for each phenolic nucleus; by reaction with (BB) acrylonitrile; said reaction being conducted in a substantially anhydrous state in the presence of an alkaline catalyst and at a temperature below the boiling point of water; with the proviso that the products of reaction be organic solvent- soluble, the molar ratio of reactants being at least 2 moles of acrylonitrile for each mole of oxyalkylated resin and not in excess of 1 mole of acrylonitrile for each hydroxyl group present in the oxyalkylated phenol-aldehyde resin; said cyanoethylation being conducted in the presence of not over 1.0 percent of an alkaline catalyst, based on the total weight of reactants.

6. The process of breaking petroleum emulsions of the water-in-oil type characterized by subjecting the emulsion to a demulsifying agent including a synthetic hydrophile product obtained by the chemical modification of (AA) hydrophile synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide; and (B) an oxyalkylation-susceptible, fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

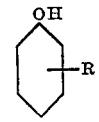

in which R is a hydrocarbon radical having at least 4 and not more than 14 carbon atoms and substituted in the 2, 4, 6 position; said oxyalkylated resin being characterized by the introduction into the resin molecule of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals and $n$ is a numeral varying from 1 to 40; with the proviso that at least 2 moles of alkylene oxide be introduced for each phenolic nucleus; by reaction with (BB) acrylonitrile; said reaction being conducted in a substantially anhydrous state in the presence of an alkaline catalyst and at a temperature below the boiling point of water; with the proviso that the products of reaction be organic solvent-soluble, the molar ratio of reactants being at least 2 moles of acrylonitrile for each mole of oxyalkylation resin and not in excess of 1 mole of acrylonitrile for each hydroxyl group present in the oxyalkylated phenol-aldehyde resin; said cyanoethylation being conducted in the presence of not over 1.0 percent of an alkaline catalyst; based on the total weight of reactants; and with the final proviso that the hydrophile properties of the final reaction product in an equal weight of xylene are sufficient to produce an emulsion when said xylene solution is shaken vigorously with one to three volumes of water.

7. The process of breaking petroleum emulsions of the water-in-oil type characterized by subjecting the emulsion to a demulsifying agent including a synthetic hydrophile product obtained by the chemical modification of (AA) hydrophile synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide; and (B) and oxyalkylation-susceptible, fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

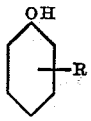

in which R is a hydrocarbon radical having at least 4 and not more than 14 carbon atoms and substituted in the 2, 4, 6 position; said oxyalkylated resin being characterized by the introduction into the resin molecular of a plurality of divalent $C_2H_4O$ and $C_3H_6O$ radicals, with the proviso that the composition of said hydrophile synthetic products, based on a statistical average and assuming completeness of reaction, and calculated back to the three oxyalkylation-step reactants, i. e., resin, ethylene oxide and propylene oxide, on a percentage weight basis must fall approximately within the area defined by the trapezoid, 1, 2, 3 and 4 of the chart in the accompanying drawing; by reaction with (BB) acrylonitrile; said reaction being conducted in a substantially anhydrous state in the presence of an alkaline catalyst and at a temperature below the boiling point of water; with the proviso that the products of reaction be organic solvent-soluble, the molar ratio of reactants being at least 2 moles of acrylonitrile for each mole of oxyalkylated resin and not in excess of one mole of acrylonitrile for each hydroxyl group present in the oxyalkylated phenol-aldehyde resin; said cyanoethylation being conducted in the presence of not over 1.0 percent of an alkaline catalyst; based on the total weight of reactants; and with the final proviso that the hydrophile properties of the final reaction product in an equal weight of xylene are sufficient to produce an emulsion when said xylene solution is shaken vigorously with one to three volumes of water.

8. The process of claim 7 with the proviso that the three oxyalkylation step reactants, i. e., resin, ethylene oxide and propylene oxide on a percentage basis must fall within the area defined by the parallelogram 5, 6, 3 and 7 on the chart in accompanying drawing.

References Cited in the file of this patent

UNITED STATES PATENTS

| 2,454,545 | Bock et al. | Nov. 23, 1948 |
| 2,457,634 | Bond et al. | Dec. 28, 1948 |
| 2,558,688 | Landa | June 26, 1951 |
| 2,589,200 | Monson | Mar. 11, 1952 |
| 2,679,484 | De Groote | May 25, 1954 |
| 2,695,887 | De Groote | Nov. 30, 1954 |
| 2,743,244 | De Groote | Apr. 26, 1956 |